(12) United States Patent
Sulea et al.

(10) Patent No.: US 12,744,037 B2
(45) Date of Patent: Sep. 22, 2026

(54) SYSTEM AND METHOD FOR CHANGE POINT DETECTION IN MULTI-MEDIA MULTI-PERSON INTERACTIONS

(71) Applicant: Xerox Corporation, Norwalk, CT (US)

(72) Inventors: Octavia Maria Sulea, San Francisco, CA (US); Leora Morgenstern, Silver Spring, MD (US); Viswanathan Babu Chidambaram Ayyappan, Brooklyn, NY (US); Jiaying Shen, Los Altos, CA (US); Gregory Michael Youngblood, Las Cruces, NM (US)

(73) Assignee: Xerox Corporation, Norwalk, CT (US)

( * ) Notice: Subject to any disclaimer, the term of this patent is extended or adjusted under 35 U.S.C. 154(b) by 334 days.

(21) Appl. No.: 18/532,815

(22) Filed: Dec. 7, 2023

(65) Prior Publication Data

US 2024/0194200 A1 Jun. 13, 2024

Related U.S. Application Data

(60) Provisional application No. 63/430,924, filed on Dec. 7, 2022.

(51) Int. Cl.

| | |
|---|---|
| ***G10L 15/22*** | (2006.01) |
| ***G06V 40/16*** | (2022.01) |
| ***G10L 15/02*** | (2006.01) |
| ***G10L 25/09*** | (2013.01) |
| ***G10L 25/24*** | (2013.01) |
| ***G10L 25/57*** | (2013.01) |

(52) U.S. Cl.
CPC ............ *G10L 15/22* (2013.01); *G06V 40/171* (2022.01); *G06V 40/176* (2022.01); *G10L 15/02* (2013.01); *G10L 25/09* (2013.01); *G10L 25/24* (2013.01); *G10L 25/57* (2013.01)

(58) Field of Classification Search
CPC ......... G10L 15/22; G10L 15/02; G10L 25/09; G10L 25/24; G10L 25/57; G10L 25/51
See application file for complete search history.

(56) References Cited

U.S. PATENT DOCUMENTS

| | | | | |
|---|---|---|---|---|
| 2017/0040030 | A1* | 2/2017 | Nakamura | G10L 25/78 |
| 2019/0318759 | A1* | 10/2019 | Doshi | G10L 15/19 |
| 2021/0304755 | A1* | 9/2021 | Sumida | G10L 15/26 |
| 2022/0392485 | A1* | 12/2022 | Brownlee | G10L 25/30 |
| 2023/0052442 | A1* | 2/2023 | Zass | G06V 20/41 |

* cited by examiner

*Primary Examiner* — Mark Villena

(57) ABSTRACT

One embodiment can provide a method and a system for detecting change points within a conversation. During operation, the system can obtain a signal associated with the conversation and extract a one-dimensional (1D) feature function from the signal. The system can apply Gaussian smoothing on the 1D feature function, identify zero-crossing points on the smoothed 1D feature function, and determine a set of change points within the conversation based on the identified zero-crossing points.

16 Claims, 7 Drawing Sheets

SYSTEM AND METHOD FOR CHANGE POINT DETECTION IN MULTI-MEDIA MULTI-PERSON INTERACTIONS

RELATED APPLICATIONS

This application claims the benefit of U.S. Provisional Application No. 63/430,924, titled "SYSTEM AND METHOD FOR INFLECTION POINT DETECTION IN MULTI-MEDIA MULTI-PERSON INTERACTIONS," by inventors Octavia Maria Sulea, Leora Morgenstern, Gregory Michael Youngblood, Jiaying Shen, and Viswanathan Babu Chidambaram Ayyappan, filed on 7 Dec. 2022, the disclosure of which is incorporated herein by reference in its entirety.

BACKGROUND

Field

This disclosure is generally related to the concept of computational culture understanding. More specifically, this disclosure is related to identifying meaningful change points in human interactions.

Related Art

Computational Cultural Understanding (CCU) is a new interdisciplinary research field in which computational methods and technologies can be used to analyze, interpret, and gain insights into various aspects of human cultures. Advances in this technology can enrich our understanding of human culture, foster cross-cultural communication, and contribute to the preservation and evolution of cultural heritage in the digital age.

One aspect of CCU involves detecting change points (e.g., shifts in topics, divergence from social norms, changes in emotions, etc.) in human interactions. More specifically, accurate detection of meaningful change points in human interactions can provide useful tools for understanding the dynamics of cultural interactions, influence, and information flow within communities.

While social norms and their impact have been widely studied within economics and sociology, computational models for norm discovery and predictive models for norm adherence or violation have only been developed recently. Emotion detection within audio data (referred to as speech emotion recognition (SER)) or video data (referred to as facial emotion recognition (FER)) is an emerging field at the intersection of computer vision, speech, and natural language processing (NLP). However, existing SER and FER approaches are limited to local, pointwise, or interval-wise detection. Detection of meaningful changes in emotions of the interlocutors or in the situations they find themselves in over time has not been studied.

SUMMARY

One embodiment can provide a method and a system for detecting change points within a conversation. During operation, the system can obtain a signal associated with the conversation and extract a one-dimensional (1D) feature function from the signal. The system can apply Gaussian smoothing on the 1D feature function, identify zero-crossing points on the smoothed 1D feature function, and determine a set of change points within the conversation based on the identified zero-crossing points.

In a variation on this embodiment, the signal can include an audio signal, and extracting the 1D feature function can include performing cepstral analysis on the audio signal to obtain one or more Mel-Frequency Cepstral Coefficients (MFCCs).

In a further variation, the system can apply the Gaussian smoothing on an MFCC and determine whether a number of identified zero-crossing points on the MFCC is within a predetermined range. In response to the number of identified zero-crossing points on the MFCC being outside of the predetermined range, the system can discard the MFCC.

In a further variation, the system can map the identified zero-crossing points on the MFCC to time instances.

In a variation on this embodiment, the system can apply a clustering technique to consolidate the identified zero-crossing points into a smaller set.

In a further variation, the system can output the consolidated zero-crossing points as the change points.

In a variation on this embodiment, the signal can include a video signal, and extracting the 1D feature function can include performing facial emotion recognition (FER) analysis on each frame of the video signal to generate a 1D conversational vibe function associated with the video signal.

In a further variation, generating the 1D conversational vibe function can include multiplying probability of a detected emotion with a valence value corresponding to the detected emotion.

In a variation on this embodiment, the system can annotate the signal using the determined set of change points.

BRIEF DESCRIPTION OF THE FIGURES

In the figures, like reference numerals refer to the same figure elements.

DETAILED DESCRIPTION

Figure 1:
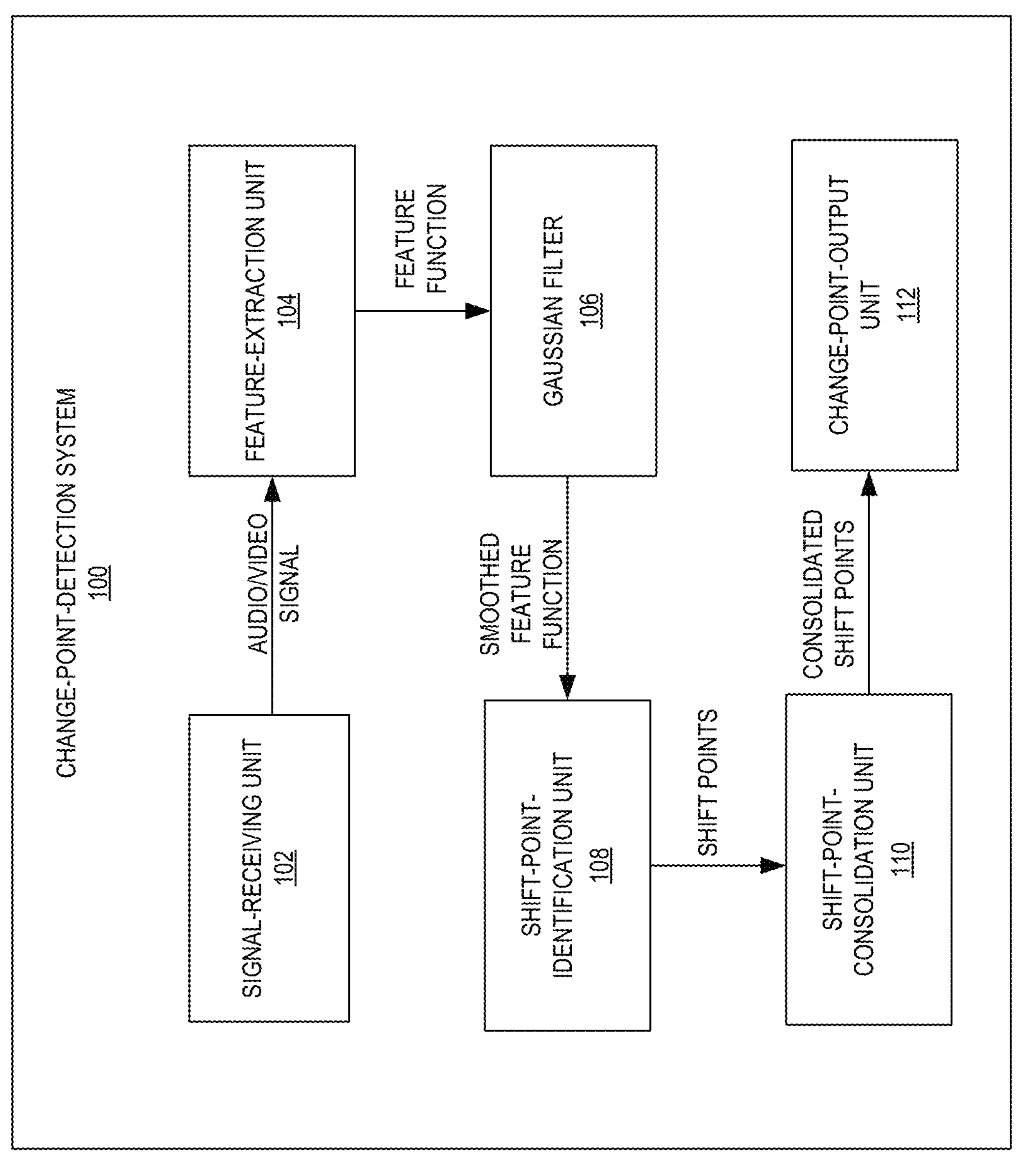
FIG. 1 illustrates an exemplary change-point-detection system for detecting meaningful change points in a conversation, according to one embodiment of the instant application.

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown but is to be accorded the widest scope consistent with the principles and features disclosed herein.

Overview

The instant application provides a solution to the problem of automatically detecting meaningful change points (e.g., time instances of events leading to changes) in human interactions. During operation, a change-point-detection system can analyze an audio or video recording of human interactions and use a combination of spectral analysis and slope detection techniques to identify change points in the flow of human interaction. More specifically, in the audio domain, the change-point-detection system can obtain the Mel-Frequency Cepstral Coefficients (MFCCs) of an audio signal and apply a Gaussian smoothing filter on each MFCC. The change-point-detection system can then identify a set of shift points (e.g., zero-crossing points) in each smoothed MFCC curve and determine the time instances corresponding to the shift points. Such time instances can represent the change points in the conversation flow. The system can further apply a clustering technique to eliminate duplicate change points and output a set of most meaningful change points. In the visual domain, the change-point-detection system can extract a one-dimensional (1D) conversational vibe function from a video file (e.g., a video recording of a conversation) and apply the Gaussian smoothing filter on the 1D conversational vibe function. The change points can be similarly identified based on the smoothed 1D conversational vibe function.

Change-Point-Detection System

Existing SER and FER systems typically produce a single prediction given a segment of an input audio or video file, meaning that the existing emotion recognition (ER) models can offer only one emotion label per selected time window of audio and/or visual input. There is a lack of solutions to collapse the predictions over multiple time windows, which can be considered as finding the global, rather than local, change points in a conversation flow. A possible solution is to use sequence-learning techniques. However, such techniques are based on supervised models, and their performance typically relies on how representative the training set is to the testing scenario. Another problem with the sequence labeling/segmentation models is that such models require training data that is more expensive to obtain than training data used for recognition tasks. To overcome these challenges, in some embodiments of the instant application, the change-point-detection system can rely on a mix of slope analysis techniques and unsupervised learning to identify meaningful change points in a conversation flow without requiring labeled data for training. Note that the meaningful change points can be associated with events (e.g., changes of expressed emotions or arousal levels of interlocutors) that are likely to impact the outcome of the conversation, the interlocutors' relationship, or goals.

One goal of the CCU is to use computer technologies to learn sociocultural norms (e.g., how people behave within and cross cultures) from text, audio, and video files that record human interactions (e.g., conversations). Detecting the emotional changes of interlocutors during human interactions can facilitate the identification of instances when social or cultural norms are violated, as people tend to become upset or angry with such incidences. Examples of change points in human interactions can include the instantiation of a sociocultural norm (e.g., a new person enters a room causing interruption in the current conversation flow as people has to greet and be greeted) or a change in expressed and perceived emotion within one or multiple interlocutors (e.g., a person receives great news and reacts to it with so much joy that it changes the direction of the conversation).

In some embodiments of the instant application, the emotional changes of interlocutors can be detected by extracting and analyzing audio and/or video features of the audio or video signal. Although mathematically speaking, inflection points on a curve representing the audio and/or video features may indicate changes, it has been shown that applying Gaussian smoothing on the feature curve can be more effective and accurate in identifying the changing points. More specifically, the shift or zero-crossing points on the Gaussian-smoothed feature curve can correspond to the change points. When duplicate shift points exist (i.e., when multiple shift points are located within a short time window and are likely to relate to the same change event), a clustering algorithm can be used to consolidate the duplicate shift points into a single point. The set of consolidated shift points can then be outputted as meaningful change points in the social interaction.

FIG. 1 illustrates an exemplary change-point-detection system for detecting meaningful change points in a conversation, according to one embodiment of the instant application. In FIG. 1, a change-point-detection system 100 can include a signal-receiving unit 102, a feature-extraction unit 104, a Gaussian filter 106, a shift-point-identification unit 108, a shift-point-consolidation unit 110, and a change-point-output unit 112.

Signal-receiving unit 102 can be responsible for receiving an audio or video signal associated with a human interaction (e.g., a conversation). In some embodiments, change-point-detection system 100 can be used for post-conversation analysis, and the audio or video signal can be a file of any appropriate format (e.g., Waveform Audio File Format or WAV, Moving Picture Experts Group or MPEG, etc.). In alternative embodiments, change-point-detection system 100 can be used for live monitoring of human interactions. For example, change-point-detection system 100 can include a camera or microphone (not shown in FIG. 1) that captures the video/audio signal of a live conversation. In another example, the audio or video signal can include a streaming audio or video signal according to any appropriate streaming protocol. The scope of this disclosure is not limited by the format or protocol associated with the audio or video signal. In addition to digital signals, it is also possible that the audio or video signal includes analog signals.

Feature-extraction unit 104 can be responsible for extracting audio/video features from the received audio/video signal. An audio or video recording of a multi-person conversation/interaction can include many complex features, but not all features are useful for the detection of change points. For example, features of an audio signal can include time-domain features, frequency-domain features, beat features, melody features, etc., and some of these features (e.g., beat and melody features) may not be important or useful for the detection of the emotional changes of the interlocutors. In some embodiments, given an audio signal, feature-extraction unit 104 can perform a cepstral analysis on the audio signal to obtain the MFCCs of the signal as the features of interest.

The MFCC feature extraction process can involve applying a discrete Fourier transform (DFT) on a signal window, taking the logarithm, and then expressing it on the Mel scale, followed by performing a discrete cosine transform (DCT). The DCT components refer to the MFCCs. Depending on the implementation, different numbers of MFCCs can be extracted from an audio signal. In some embodiments, feature-extraction unit 104 can implement the librosa package in the Python programming language to extract the MFCC features. In further embodiments, feature-extraction unit 104 can extract between 13 and 20 MFCCs, with each MFCC representing a 1D audio feature function.

On the other hand, for a video signal, feature-extraction unit 104 can extract features from a video signal by multiplying the probability that one of the eight emotions (i.e., joy, trust, fear, surprise, sadness, anticipation, anger, and disgust, according to the Plutchik's Model of emotions) is present in a video frame with its valence (whether it is a positive, negative, or neutral emotion) to create a 1D video feature function. In some embodiments, feature-extraction unit 104 can implement a face-detection technique to detect human faces in the video frame and analyze facial landmarks to determine the emotion associated with each detected face. Note that a video frame may or may not include a human face. Also note that, although a video clip or file may also include audio, the emotion detection is based on images only, and the audio signal accompanying the video signal can be ignored.

Gaussian filter 106 can apply a 1D Gaussian smoothing operation on the extracted audio/video feature function(s). For an audio signal, Gaussian filter 106 can apply 1D Gaussian smoothing on each MFCC to obtain a number of smoothed MFCC feature functions. Each smoothed MFCC feature function can be referred to as a conversational flow. An audio signal can be represented using multiple conversational flows, with each flow being a distinct MFCC feature function. Note that the MFCCs are independent of each other. For a video signal, Gaussian filter 106 can apply 1D Gaussian smoothing on the extracted 1D video feature function, and the smoothed video feature function can be referred to as a conversational vibe. Note that applying the 1D Gaussian smoothing can be similar to performing a derivative operation on the feature function(s).

Shift-point-identification unit 108 can be responsible for identifying shift points (defined as the zero-crossing points) included in the smoothed audio or video feature functions. Note that a Gaussian-smoothed feature function may not include any shift point, and not all shift points correlate with meaningful changes in the conversation. In some embodiments of the instant application, shift-point-identification unit 108 can also determine whether the number of shift points included in a feature function is within a predetermined reasonable range. If there are too many or too few shift points, it may be determined that no meaningful change point can be detected from that particular Gaussian-smoothed feature function. In one embodiment, the lower bound of the predetermined reasonable range can be one, and the upper bound can be determined based on the size of the time window. Considering that normal human emotional changes are often on a time scale of minutes, the upper bound of the predetermined reasonable range can be about an order of magnitude smaller than the time window measured in seconds. In one example, if the time window is n seconds, the upper bound can be set as n/10.

Shift-point-consolidation unit 110 can be responsible for clustering and consolidating shift points. Even with Gaussian smoothing, there can be plenty of noise in the feature functions, which may result in frequent zero-crossings of the smoothed function within a relatively short interval (e.g., a few seconds). These clustered shift points may in fact be associated with the same change event. In other words, they might be duplicates of each other. In some embodiments, shift-point-consolidation unit 110 can apply a clustering technique (e.g., hierarchical clustering) to identify and remove duplicate shift points. In one embodiment, a cluster of shift points can be consolidated into a single point (typically represented by the first or earliest shift point), and other shift points in the cluster can be removed.

The consolidated shift points can be sent to change-point-output unit 112, which can output these shift points as detected change points. If the shift points are detected in the cepstral domain, change-point-output unit 112 can also be responsible for mapping the detected shift points to time instances and output the mapped time instances. In some embodiments, the outputted change points can be used to automatically annotate/label the video/audio signal to allow the annotated signal to be used as a training sample for training a machine learning model that can recognize and analyze higher-order organizational structures present in conversations. Because the change points are detected automatically and efficiently, it is possible to apply this change-point-detection method to a large set of audio and video files to generate a large number of labeled training samples. This approach can be particularly useful for conversations that take place over extended periods, as existing approaches are typically limited to smaller units of exchanges.

Detecting Change Points Based on an Audio Signal

Figure 2:
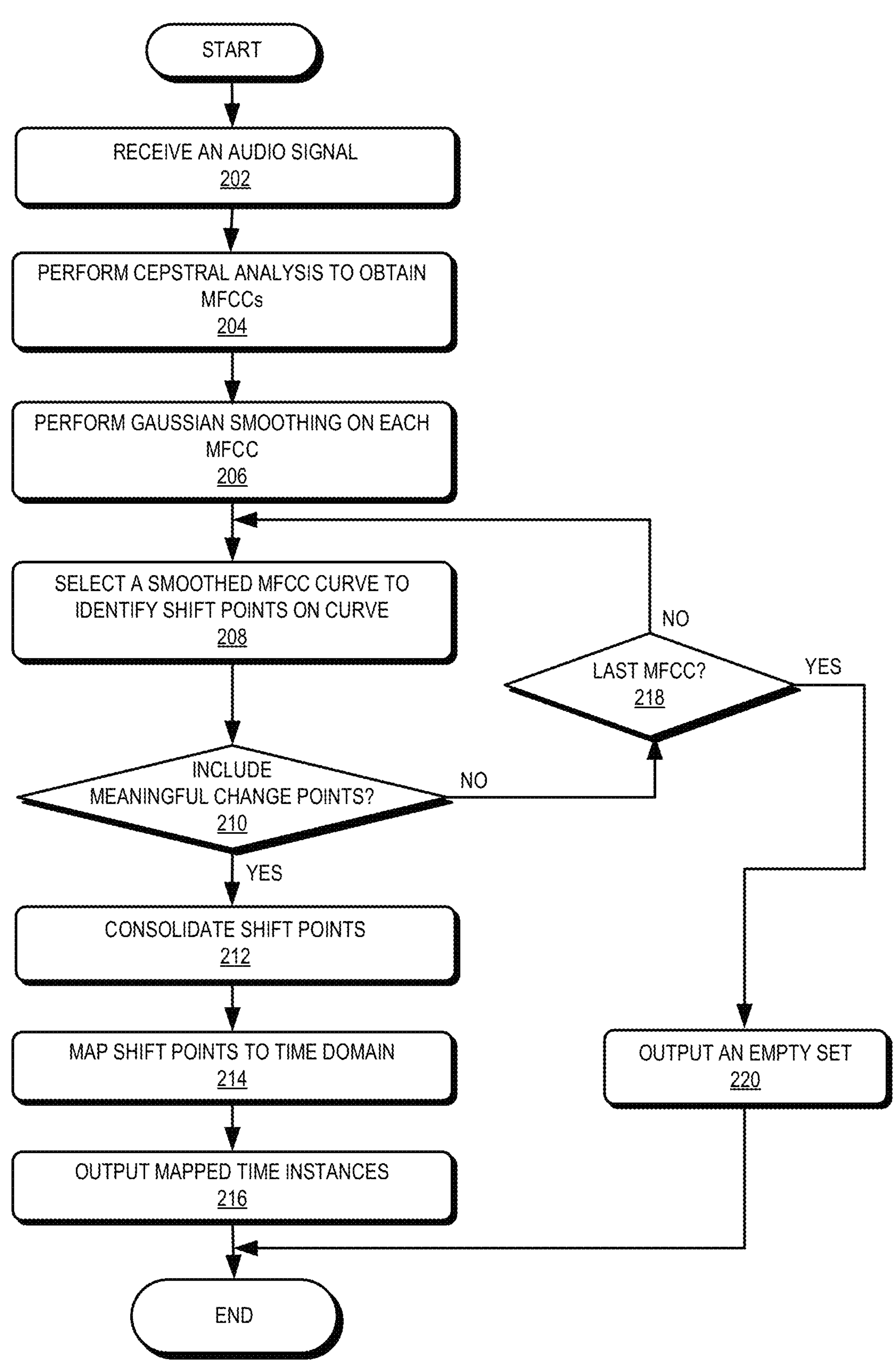
FIG. 2 presents a flowchart illustrating an exemplary process for detecting meaningful change points in a conversation based on an audio signal, according to one embodiment of the instant application.
Figure 3A:
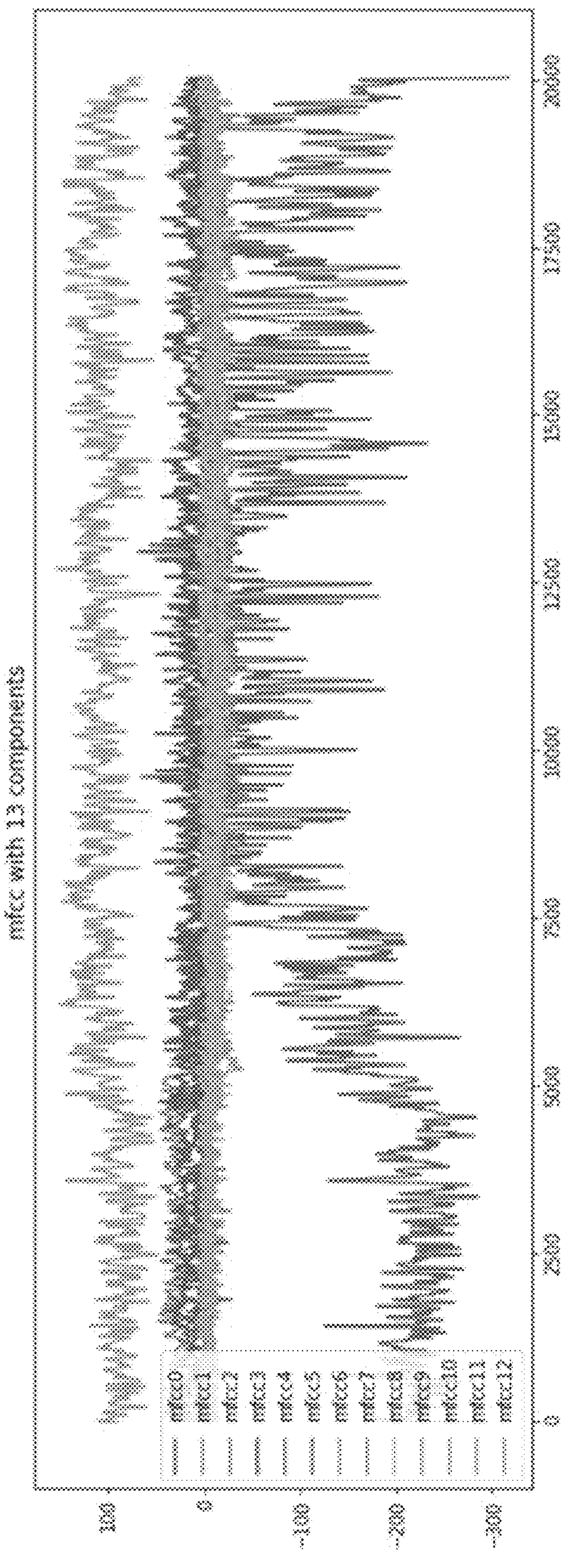
FIG. 3A illustrates an example of the extracted Mel-Frequency Cepstral Coefficients (MFCCs).

FIG. 2 presents a flowchart illustrating an exemplary process for detecting meaningful change points in a conversation based on an audio signal, according to one embodiment of the instant application. During operation, the system can receive an audio signal (operation 202). The audio signal can be an audio file containing the recording of a conversation or a live-stream audio signal. The system can perform the cepstral analysis on the audio signal to obtain a plurality of MFCCs of the audio signal (operation 204). FIG. 3A illustrates an example of the extracted MFCCs. In this example, 13 MFCCs are extracted from the received audio signal.

Returning to FIG. 2, the system can perform Gaussian smoothing on each MFCC (operation 206). More specifically, the system can apply a 1D Gaussian smoothing filter on each MFCC. The size of the window for the Gaussian smoothing can be user-defined. In one example, the variance of the Gaussian smoothing function (i.e., sigma) can be set as 100. In one example, the system can implement the 1D Gaussian filter included in the SciPy library.

The system can select a Gaussian-smoothed MFCC curve (e.g., starting from the lowest frequency band) to identify shift points on the MFCC curve (operation 208). The shift points can be defined as the zero-crossing points (i.e., when the MFCC change signs) on the MFCC curve. The system can also determine whether the selected MFCC can include meaningful change points (operation 210). In some embodiments, the system can count the number of shift or zero-crossing points on the MFCC curve and determine whether it is within a predetermined reasonable range. The lower bound of such a reasonable range can be one, and the upper bound can be determined based on the duration of the audio signal. In one embodiment, the upper bound can be one magnitude smaller than the duration of the audio signal measured in seconds.

If the number of shift points on the MFCC curve is within the reasonable range, the system can determine that the MFCC curve includes meaningful change points. The system can then apply a clustering technique to consolidate the detected shift points on the MFCC curve into a smaller set (operation 212). According to some embodiments, the system can perform unsupervised learning (e.g., using a hierarchical clustering model) technique to consolidate the shift points. In one example, the system can place an upper limit on the number of shift points in the consolidated smaller set.

Figures 3B, 3C:
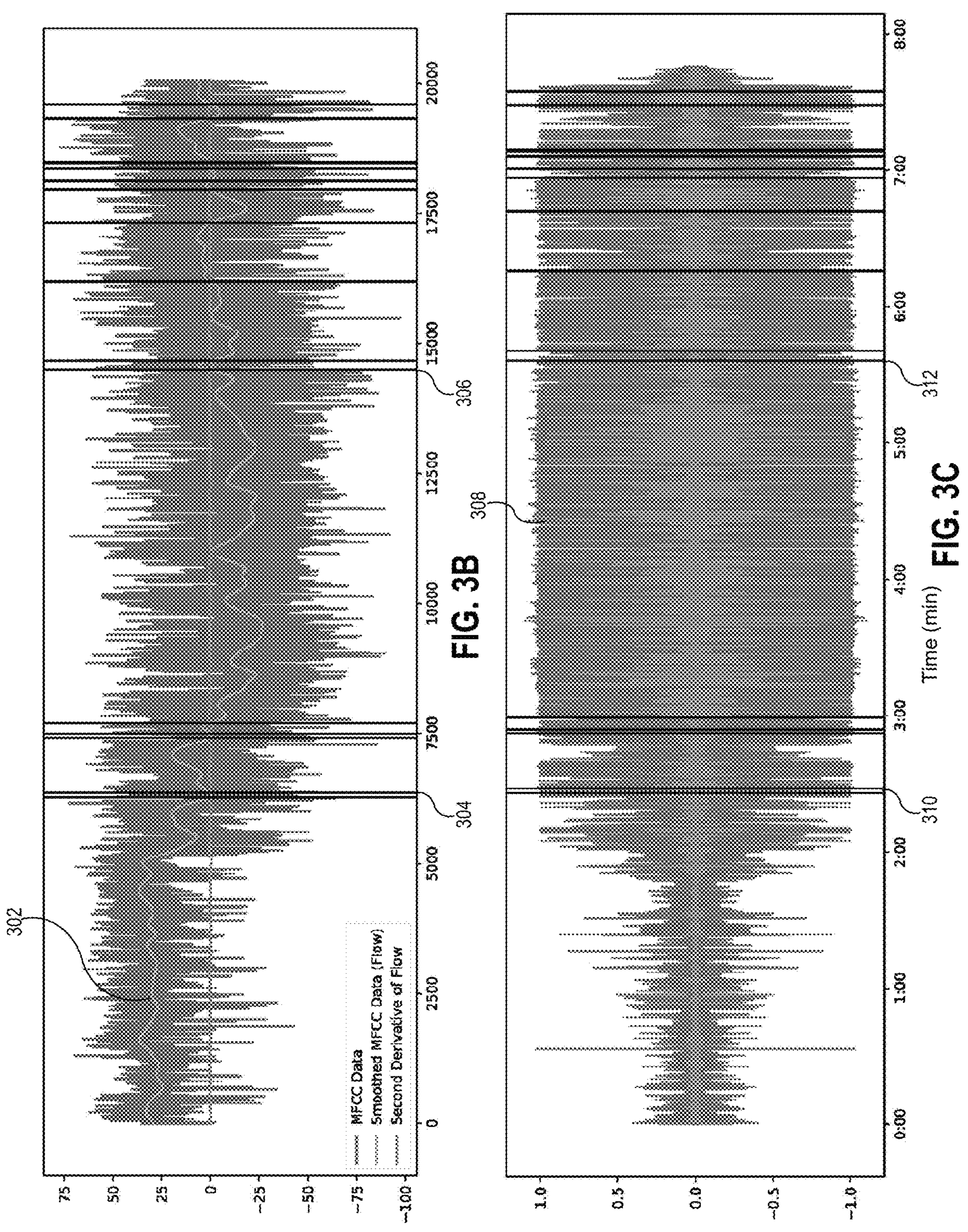
FIG. 3B illustrates an example of shift points detected on a smoothed MFCC curve, according to one embodiment of the instant application.
FIG. 3C illustrates the shift points overlapping with the audio signal in the time domain, according to one embodiment of the instant application.

FIG. 3B illustrates an example of shift points detected on a smoothed MFCC curve, according to one embodiment of the instant application. In this example, the noisy signal is the MFCC, and curve 302 represents the Gaussian-smoothed MFCC curve. For reference, the second derivative of the MFCC is also shown (i.e., the relatively flat curve in FIG. 3B). The vertical lines (e.g., lines 304 and 306) indicate the locations of the zero-crossing points. Note that some shift points are very close to each other and can be clustered or consolidated as one shift point.

Returning to FIG. 2, considering that the MFCC is expressed in the cepstral domain, in some embodiments, the system can map the detected zero-crossing points from the cepstral domain back to the regular time domain (operation 214) and can output the consolidated shift points mapped back to the regular time domain (i.e., the mapped time instances) as meaningful change points (operation 216). The shift points in the regular time domain can indicate the time instances when meaningful changes occur in the conversation. FIG. 3C illustrates the shift points (i.e., indicated by the vertical lines) overlapping with the audio signal in the time domain, according to one embodiment of the instant application. More specifically, FIG. 3C shows the original audio signal 308. The shift points in FIG. 3B have been converted into time instances, indicated as vertical lines (e.g., lines 310 and 312) overlapping with audio signal 308. The intersections between those vertical lines and the time axis are the time instances when changes in the conversation occur. In the example shown in FIG. 3C, at least one change can be detected between the $2^{nd}$ and $3^{rd}$ minute.

Returning to FIG. 2, if the number of shift points in the MFCC curve is outside of the reasonable range (e.g., too many zero-crossing points on the curve), the system can determine that the MFCC curve cannot output meaningful change points or the MFCC curve is not suitable for predicting changes in the conversation. In such a case, the MFCC curve can be discarded. The system can determine whether this is the last MFCC (operation 218). If not, the system can select the next MFCC curve (operation 208). If there is no more unexamined MFCC curve, the system can output an empty set (operation 220), indicating that no meaningful change is detected in the conversation.

Detecting Change Points Based on a Video Signal

Figure 4:
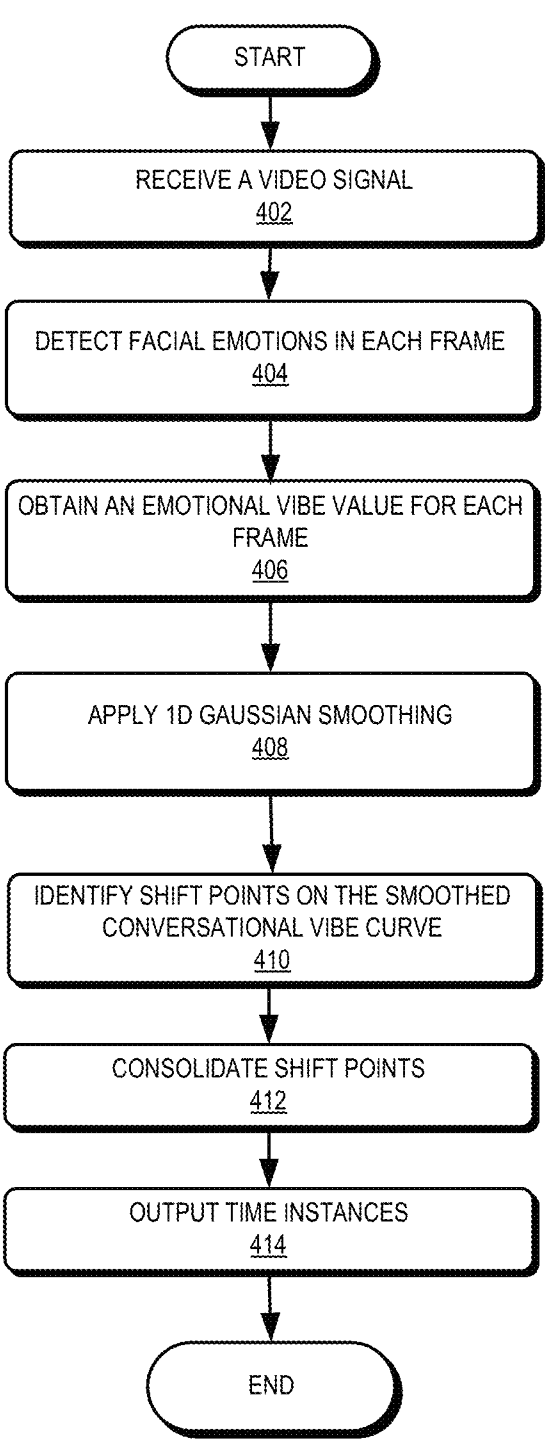
FIG. 4 presents a flowchart illustrating an exemplary process for detecting meaningful change points in a conversation based on a video signal, according to one embodiment of the instant application.

FIG. 4 presents a flowchart illustrating an exemplary process for detecting meaningful change points in a conversation based on a video signal, according to one embodiment of the instant application. During operation, the system can receive a video signal (operation 402). The video signal can be a video file (e.g., an MP3 file) containing the recording of a conversation of multiple individuals or a live-stream video signal of the conversation.

For each frame in the video signal, the system can detect the facial emotions of individuals in the frame (operation 404). In some embodiments, a previously trained FER model can be used to recognize facial emotions. Although a video clip typically includes an accompanied audio signal, the FER model uses images (i.e., video frames) to detect emotion and ignores the audio signal accompanying the video signal. The system can obtain an emotional vibe value of each frame by multiplying the probability of a detected emotion with its valence (operation 406). Note that, according to Plutchik's model, the valence of positive emotions (e.g., joy and trust) can be one, the valence of negative emotions (e.g., anger and sadness) can be zero, and the valence of neural emotions (e.g., surprise) can be zero. The video frames can be aligned in the time domain, and the emotional vibe values can be a function of time. This way, the complex video signal can be converted into a 1D feature function (i.e., the conversational vibe function). The system can then apply 1D Gaussian smoothing on the conversational vibe function to obtain a smoothed conversational vibe curve (operation 408) and identify the zero-crossing or shift points on the smoothed conversational vibe curve (operation 410).

Figures 5A, 5B:
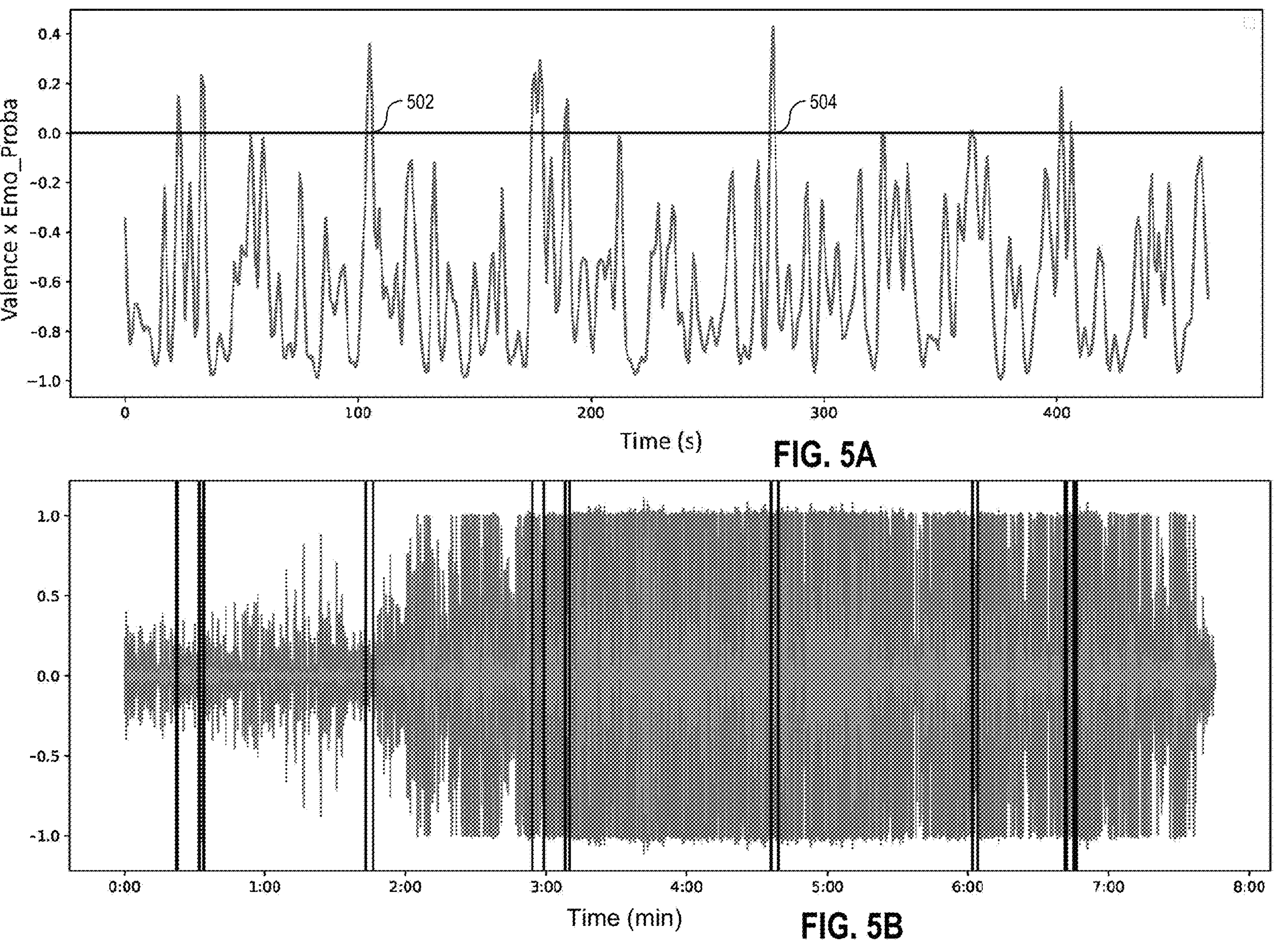
FIG. 5A illustrates an exemplary conversational vibe curve obtained from a video signal, according to one embodiment of the present invention.
FIG. 5B illustrates the detected shift points overlapping with an audio signal corresponding to the video signal, according to one embodiment of the instant application.

FIG. 5A illustrates an exemplary conversational vibe curve obtained from a video signal, according to one embodiment of the present invention. The horizontal line can mark where the smoothed conversational vibe curve crosses zero, thus indicating the locations of the shift points (e.g., points 502 and 504). FIG. 5B illustrates the detected shift points overlapping with an audio signal corresponding to the video signal, according to one embodiment of the instant application. Note that the vertical lines can be used to indicate the time instances corresponding to the detected shift points.

Returning to FIG. 4, the system can apply a clustering technique to consolidate the detected shift points on the conversational vibe curve to a smaller set (operation 412). In one embodiment, a hierarchical clustering technique can be used to consolidate the shift points. The system can then output the time instances corresponding to the consolidated shift points as the detected change points in the conversation (operation 414).

In the example shown in FIG. 4 and FIGS. 5A-5B, the change points in a video clip are determined based on video signals (i.e., images) only. In alternative examples, the change points in a video clip can be determined based on a combination of the audio and video signals. In one example, the change-point-detection system can combine the change points identified based on the audio signal with the change points identified based on the video signal. In another example, a time instance is determined as a meaningful change point if and only if a change event is detected on both the audio and video signals.

Computer System

Figure 6:
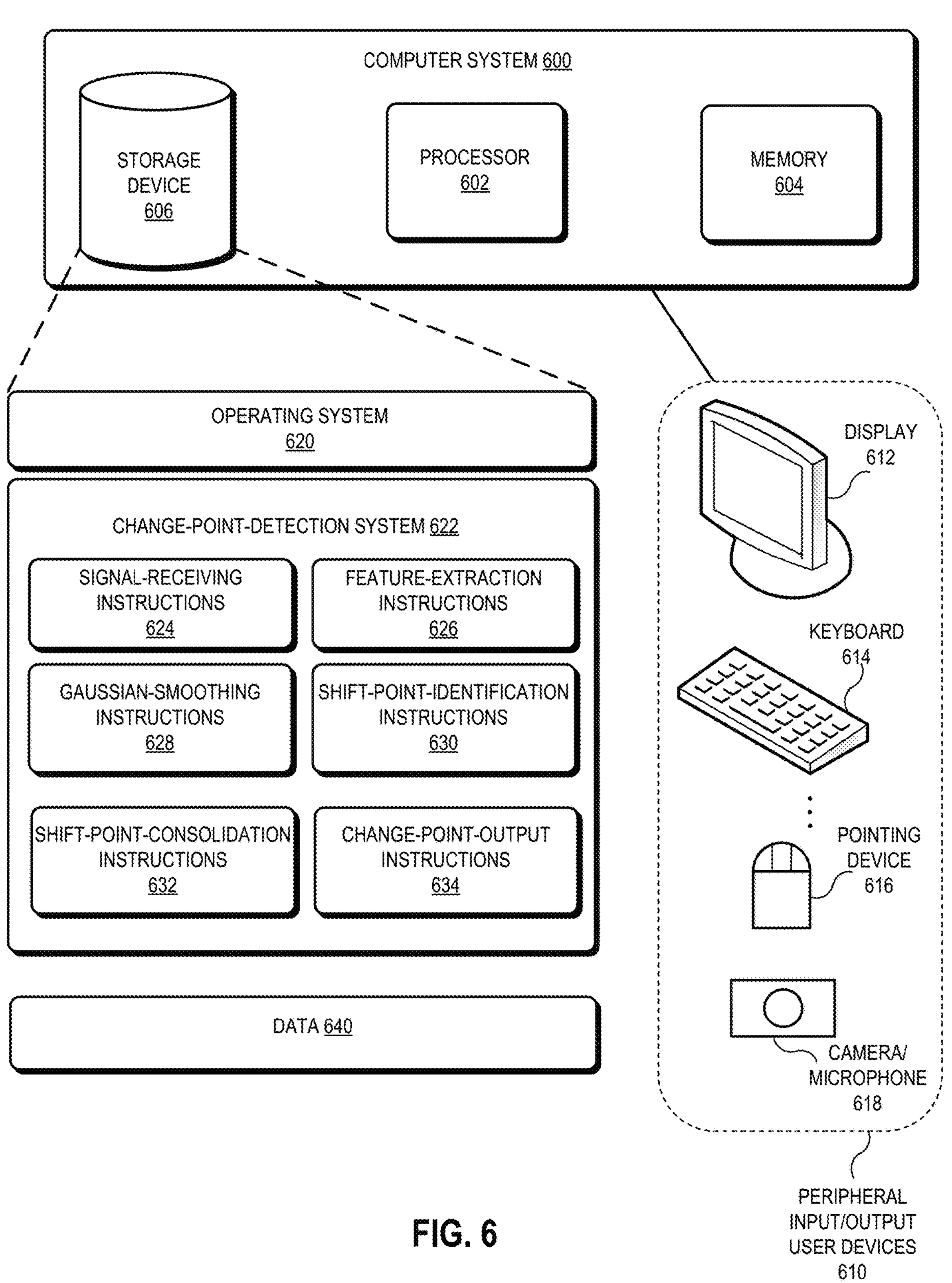
FIG. 6 illustrates an exemplary computer system that facilitates detecting meaningful change points in human interactions based on audio or video signals, according to one embodiment of the instant application.

FIG. 6 illustrates an exemplary computer system that facilitates detecting meaningful change points in human interactions based on audio or video signals, according to one embodiment of the instant application. Computer system 600 includes a processor 602, a memory 604, and a storage device 606. Furthermore, computer system 600 can be coupled to peripheral input/output (I/O) user devices 610, e.g., a display device 612, a keyboard 614, a pointing device 616, and a camera/microphone 618. Storage device 606 can store an operating system 620, a change-point-detection system 622, and data 640.

Change-point-detection system 622 can include instructions, which when executed by computer system 600, can cause computer system 600 or processor 602 to perform methods and/or processes described in this disclosure. Specifically, change-point-detection system 622 can include instructions for receiving an audio or video signal (signal-receiving instructions 624), instructions for extracting audio/video features from the received signal (feature-extraction instructions 626), instructions for applying 1D Gaussian smoothing (Gaussian-smoothing instructions 628), instructions for identifying shift points on a 1D audio/video feature function (shift-point-identification instructions 630), instructions for consolidating duplicate shift points (shift-point-consolidation instructions 632), and instructions for outputting the consolidated shift points as change points (change-point-output instructions 634).

In general, the disclosed embodiments can provide a solution to the problem of detecting meaningful change points in human interactions (e.g., conversations) based on audio or video signals associated with such interactions. The proposed solution can apply change detection strategies (i.e., identifying zero-crossing points of a Gaussian-smoothed curve) in the domain of CCU to identify communicative changes in a conversation or interaction. The proposed solution can represent a complex audio or video signal as a 1D function by extracting features that are useful for change-point detection. For example, an audio signal can be represented using a set of MFCCs, and a video signal can be represented as a 1D conversational vibe function using higher-order concepts like emotion and valence. The proposed solution can be used for the specification and analysis of multiple features such as changes in the "energy" of a room and the number of participants active in a conversation. The proposed change-point-detection solution can also be used on large sets of audio or video signals to provide a large amount of annotated or labeled training samples for training a machine learning model that can recognize and analyze higher-order organizational structures that are present in conversations taking place over extended periods.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for detecting changes in human emotions during a conversation, the method comprising:
- recording the conversation using a camera or microphone;
- obtaining, by a computer, a signal associated with the recorded conversation;
- extracting a one-dimensional (1D) feature function from the signal;
- applying Gaussian smoothing on the 1D feature function;
- identifying zero-crossing points on the smoothed 1D feature function; and
- consolidating the identified zero-crossing points into a smaller set by applying a hierarchical clustering technique on the identified zero-crossing points; and
- determining, by the computer, a set of change points indicating the changes in human emotions during the conversation based on the smaller set of zero-crossing points.

2. The method of claim 1,
- wherein the signal comprises an audio signal; and
- wherein extracting the 1D feature function comprises performing cepstral analysis on the audio signal to obtain one or more Mel-Frequency Cepstral Coefficients (MFCCs).

3. The method of claim 2, further comprising:
- applying the Gaussian smoothing on a Mel-Frequency Cepstral Coefficient (MFCC);
- determining whether a number of identified zero-crossing points on the MFCC is within a predetermined range; and
- in response to the number of identified zero-crossing points on the MFCC being outside of the predetermined range, discarding the MFCC and selecting a different MFCC for processing.

4. The method of claim 2, further comprising mapping the identified zero-crossing points on the MFCC to time instances.

5. The method of claim 1,
- wherein the signal comprises a video signal; and
- wherein extracting the 1D feature function comprises performing facial emotion recognition (FER) analysis on each frame of the video signal to generate a 1D conversational vibe function associated with the video signal.

6. The method of claim 5, wherein generating the 1D conversational vibe function further comprises multiplying probability of a detected emotion with a valence value corresponding to the detected emotion.

7. The method of claim 1, further comprising annotating the signal using the determined set of change points.

8. A non-transitory computer-readable storage medium storing instructions that when executed by a processor cause the processor to perform a method for detecting changes in human emotions during a conversation, the method comprising:
- configuring a camera or microphone to record the conversation;
- obtaining a signal associated with the conversation;
- extracting a one-dimensional (1D) feature function from the signal;
- applying Gaussian smoothing on the 1D feature function;
- identifying zero-crossing points on the smoothed 1D feature function;
- consolidating the identified zero-crossing points into a smaller set by applying a hierarchical clustering technique on the identified zero-crossing points; and
- determining, by the computer, a set of change points indicating the changes in human emotions during the conversation based on the smaller set of zero-crossing points.

9. The non-transitory computer-readable storage medium of claim 8,
- wherein the signal comprises an audio signal; and wherein extracting the 1D feature function comprises performing cepstral analysis on the audio signal to obtain one or more Mel-Frequency Cepstral Coefficients (MFCCs).

10. The non-transitory computer-readable storage medium of claim 9, wherein the method further comprises:

applying the Gaussian smoothing on a Mel-Frequency Cepstral Coefficient (MFCC);

determining whether a number of identified zero-crossing points on the MFCC is within a predetermined range; and in response to the number of identified zero-crossing points on the MFCC being outside of the predetermined range, discarding the MFCC and selecting a different MFCC for processing.

11. The non-transitory computer-readable storage medium of claim 9, wherein the method further comprises mapping the identified zero-crossing points on the MFCC to time instances.

12. The non-transitory computer-readable storage medium of claim 8, wherein the signal comprises a video signal; and wherein extracting the 1D feature function comprises performing facial emotion recognition (FER) analysis on each frame of the video signal to generate a 1D conversational vibe function associated with the video signal.

13. The non-transitory computer-readable storage medium of claim 12, wherein generating the 1D conversational vibe function further comprises multiplying probability of a detected emotion with a valence value corresponding to the detected emotion.

14. The non-transitory computer-readable storage medium of claim 8, wherein the method further comprises annotating the signal using the determined set of change points.

15. A computer system, comprising:

a processor; and a storage device storing instructions that when executed by the processor cause the processor to perform a method for detecting changes in human emotions during a conversation, the method comprising:

configuring a camera or microphone to record the conversation;

obtaining a signal associated with the conversation;

extracting a one-dimensional (1D) feature function from the signal;

applying Gaussian smoothing on the 1D feature function;

identifying zero-crossing points on the smoothed 1D feature function;

consolidating the identified zero-crossing points into a smaller set by applying a hierarchical clustering technique on the identified zero-crossing points; and determining a set of change points indicating the changes in human emotions during the conversation based on the smaller set of zero-crossing points.

16. The computer system of claim 15, wherein the method further comprises applying a clustering technique to consolidate the identified zero-crossing points into a smaller set.

* * * * *